(12) United States Patent
Turng et al.

(10) Patent No.: US 8,475,703 B2
(45) Date of Patent: Jul. 2, 2013

(54) METHOD OF ORIENTATING FILLERS IN COMPOSITE MATERIALS

(75) Inventors: Lih-Sheng Turng, Madison, WI (US); Larry R. Holmes, Jr., Cambridge, WI (US); Yiyan Peng, Madison, WI (US); Xiaochun Li, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 727 days.

(21) Appl. No.: 12/688,348

(22) Filed: Jan. 15, 2010

(65) Prior Publication Data

US 2011/0175259 A1    Jul. 21, 2011

(51) Int. Cl.
*B29C 67/00* (2006.01)

(52) U.S. Cl.
USPC ........... 264/437; 264/438; 264/439; 264/440; 264/441

(58) Field of Classification Search
USPC .......................... 264/437, 438, 439, 440, 441
See application file for complete search history.

(56) References Cited

PUBLICATIONS

"Alignment of Particles by an Electric Field", C. Park et al, Materials Science and Engineering A257, 1998, pp. 295-311.
Field Aided Technology for Local Micro-Tailoring of Polymeric Composites With Multi-Functional Response, Ph.D. Thesis, University of Wisconsin-Madison, 2003.
"Study of Fiber Orientation in Photopolymer Resin Under the Electric Field", C-K Zhu et al, Journal of Zhenjiang, University of Technology, Feb. 2004, vol. 32, No. 1.
"Preparation of Composite Fuel Cell Membranes Containing Electric Field Aligned Inorganic Particles", M. Yates et al, DOE Progress Report (undated, estimated 2006, 2007).

*Primary Examiner* — Yogendra Gupta
*Assistant Examiner* — John Robitaille
(74) *Attorney, Agent, or Firm* — Boyle Fredrickson, S.C.

(57) ABSTRACT

A method is provided of fabricating a composite incorporating fillers. The method includes the steps of depositing the fillers in a matrix material either in a rapid prototyping device or prior to inserting the matrix material into a mold. The mold is positioned at a desired location with respect to an electrical field such that at least a portion of the fillers in the matrix material align in a first direction in response thereto. For producing a heterogeneous composite through a rapid prototyping process, the electrodes are positioned at a desired orientation to align the fillers. Thereafter, at least a portion of the matrix material is cured with desirable filler orientation. The procedure is repeated with the desired filler orientation and distribution being introduced layer by layer within the composite.

17 Claims, 4 Drawing Sheets

METHOD OF ORIENTATING FILLERS IN COMPOSITE MATERIALS

REFERENCE TO GOVERNMENT GRANT

This invention was made with United States government support awarded by the following agencies: NSF 0225080. The United States government has certain rights in this invention.

FIELD OF THE INVENTION

This invention relates generally to polymer composites, and in particular, to a method for fabricating polymer composites incorporating fillers with multi-directional orientations.

BACKGROUND AND SUMMARY OF THE INVENTION

Engineering materials continue to progress as technology advances. New materials are designed to surpass the requirements of the old. Rigidity, strength, weight, density, impact resistance, electrical and optical properties and many other material properties can be manipulated to suit a desired function. Over the past decade, polymer composites have emerged as new classes of high performance materials with unique material properties. These composites are created using two or more materials with individual material properties that combine to create a new structure with tailored properties.

In order to enhance the desired properties of these high performance materials, fillers such as fibers or particles may be imbedded into the matrix material. Normally, fillers are distributed in a uniform fashion throughout the matrix material. The heterogeneity of the fillers distributed throughout the matrix material provides predictable properties and mechanical responses of the materials. However, the spatial orientation and distribution of the fillers are strongly dependent on the ways in which the materials were prepared and processed. In other words, poor preparation and processing of the matrix material may lead to non-uniform distribution or undesirable orientation of the fillers. Further, since present methodologies contemplate the uniform distribution of the fillers throughout the matrix material, the finished composite cannot be locally tailored to have different properties in different locations.

Locally tailored, finished composites that have different properties in different locations are known as functionally graded materials. These functionally graded materials vary in composition and structure gradually over volume, resulting in corresponding changes in the properties of the material. As a result, functionally graded materials can be designed for specific functions and applications. By way of example, functionally graded materials have been developed for use in optical, biological, and electrical systems. Various processes have been utilized to fabricate these functionally graded materials such as impeller drying process (IDP), thermal spraying, controlled segregation, controlled blending, and others. However, these processes have proven drawbacks. For example, some of these processes can only be created in small laboratory quantities, while others have issues with high quality reproducibility.

Therefore, it is a primary object and feature of the present invention to provide a method for fabricating polymer composites incorporating fillers with multi-directional orientations.

It is a further object and feature of the present invention to provide a method for fabricating polymer composites incorporating fillers with multi-directional orientations that allows for the fillers to be orientated in a direction or concentration suitable for a particular composite requirement.

It is a still further object and feature of the present invention to provide a method for fabricating polymer composites incorporating fillers with multi-directional orientations that is simple, inexpensive and allows that the polymer composites to be produced on a larger scale than prior methods.

In accordance with the present invention, a method is provided of fabricating a composite incorporating fillers. The method includes the steps of depositing the fillers in a matrix material and exposing at least a portion of the matrix material to an electrical field such that the fillers in the at least a portion of the matrix material align in a first direction in response thereto. The at least a portion of the matrix material is then cured, thereby locking the desirable first filler orientation with the composite.

The at least a portion of the matrix material may be a first portion of matrix material and the method may include the additional step of exposing a second portion to matrix material to the electrical field such that the fillers in the second portion of the matrix material align in a second direction. Thereafter, the second portion of the matrix material is cured. Alternatively, the method may include the additional step of depositing the first portion of the matrix material in a mold prior to exposing the first portion of the matrix material to the electrical field. Thereafter, a second portion of the matrix material may be deposited in contact with the first portion of matrix material. The second portion of matrix material is exposed to an electrical field such that the fillers in the second portion of the matrix material align in a second direction in response thereto. The second portion of the matrix material is then cured. The first direction may be generally parallel to the second direction.

It is contemplated to disperse the fillers in the matrix material prior to exposing the at least a portion of the matrix material to the electrical field. The step of exposing at least a portion of the matrix material to an electrical field may include the additional steps of depositing the matrix material in a mold and positioning the mold at a desired location with respect to the electrical field. Alternatively, the step of exposing at least a portion of the matrix material to an electrical field includes the step of positioning the electrical field at a desired location with respect to the matrix material.

In accordance with a further aspect of the present invention, a method is provided of fabricating a composite incorporating fillers. The method includes the steps of depositing the fillers in a matrix material and inserting the matrix material into a mold. The mold is positioned at a desired location with respect to an electrical field such that at least a portion of the fillers in the matrix material align in a first direction in response thereto. At least a portion of the matrix material is then cured.

The at least a portion of the matrix material may be a first portion of matrix material and the method may include the additional step of exposing a second portion to matrix material to the electrical field such that the fillers in the second portion of the matrix material align in a second direction. The second portion of the matrix material is then cured. The first direction may be generally parallel to the second direction. Alternatively, the method may include the additional steps of depositing a second portion of the matrix material in contact with the first portion and exposing the second portion of the matrix material to the electrical field. At least a portion of the second portion matrix material is then cured.

The fillers may be dispersed in the matrix material prior to inserting the matrix material into the mold. In addition, it is contemplated for the electrical field to be positioned at a desired location with respect to the matrix material.

In accordance with a still further aspect of the present invention, a method is provided of fabricating a composite incorporating fillers. The method includes the steps of inserting the matrix material having fillers into a mold and positioning the mold within a stimulus field such that at least a portion of the fillers in the matrix material align in a first direction in response thereto. Thereafter, at least a portion of the matrix material is cured.

It is contemplated for the stimulus field to be an electrical field. At least a portion of the matrix material may be a first portion of matrix material and the method may include the additional step of exposing a second portion to matrix material to the stimulus field such that the fillers in the second portion of the matrix material align in a second direction. The second portion of the matrix material is then cured. Alternatively, the method may include the additional step of depositing the first portion of the matrix material in a mold prior to exposing the first portion of the matrix material to the stimulus field. A second portion of the matrix material is deposited in contact with the first portion of matrix material. The second portion of matrix material is exposed to the stimulus field such that the fillers in the second portion of the matrix material align in a second direction in response thereto. The second portion of the matrix material is then cured. The first direction may be generally parallel to the second direction.

The fillers may be dispersed in the matrix material prior to inserting the matrix material into the mold. In addition, the step of positioning the mold within a stimulus field may include the additional step of positioning the stimulus field at a desired location with respect to the matrix material.

BRIEF DESCRIPTION OF THE DRAWINGS

The drawings furnished herewith illustrate a preferred construction of the present invention in which the above advantages and features are clearly disclosed as well as others which will be readily understood from the following description of the illustrated embodiment.

In the drawings.

DETAILED DESCRIPTION OF THE DRAWINGS

Figure 1:
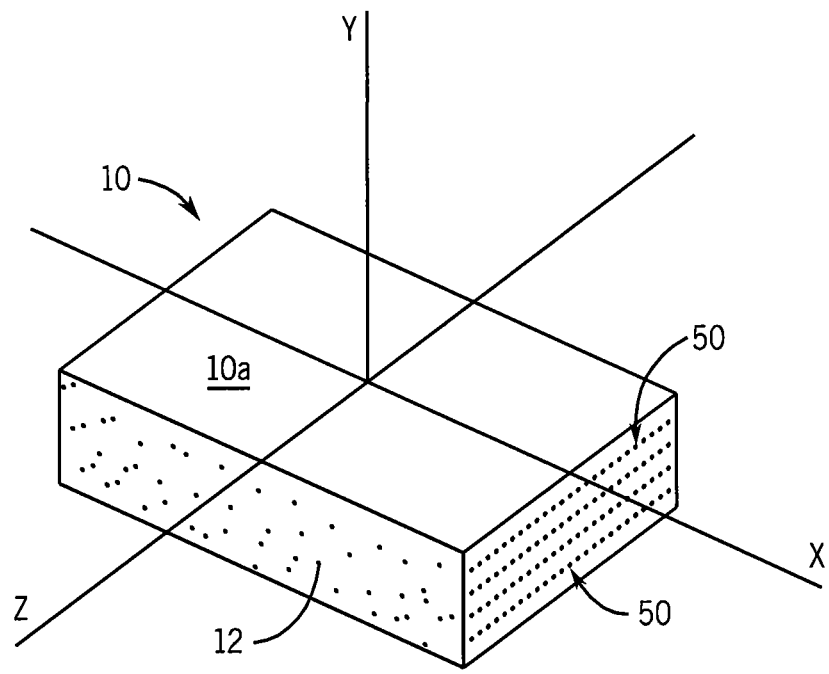
FIG. 1 is a schematic, isometric view of a composite fabricated in accordance with the methodology of the present invention.
Figure 3:
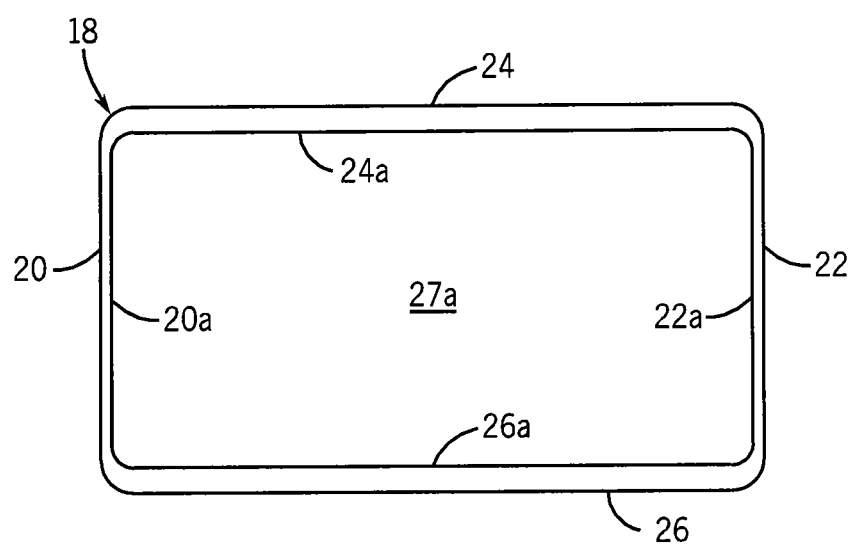
FIG. 3 is a top plan view of an exemplary mold for use in the methodology of the present invention.
Figure 2:
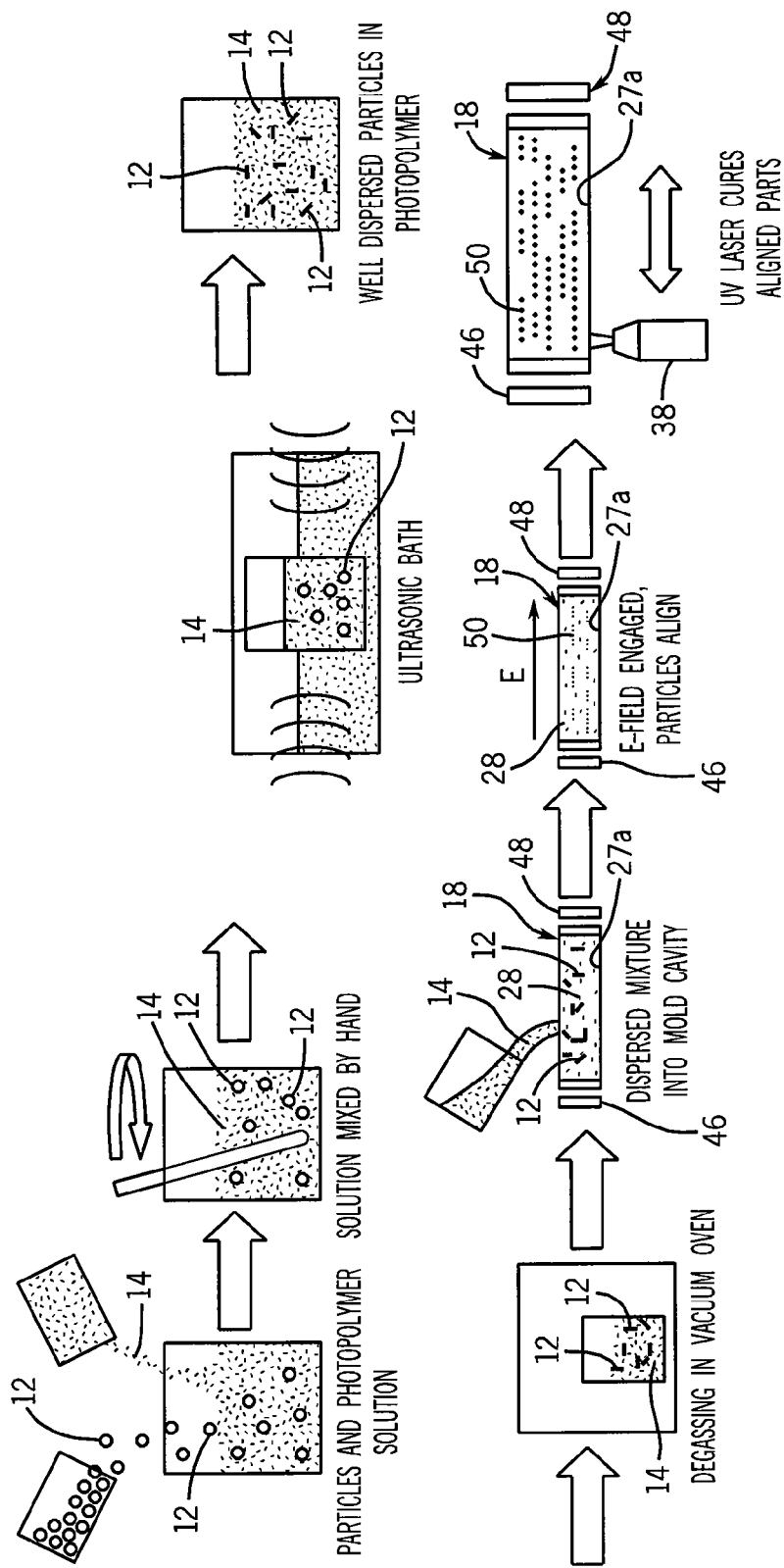
FIG. 2 is a schematic flow chart of the methodology of the present invention.
Figure 4:
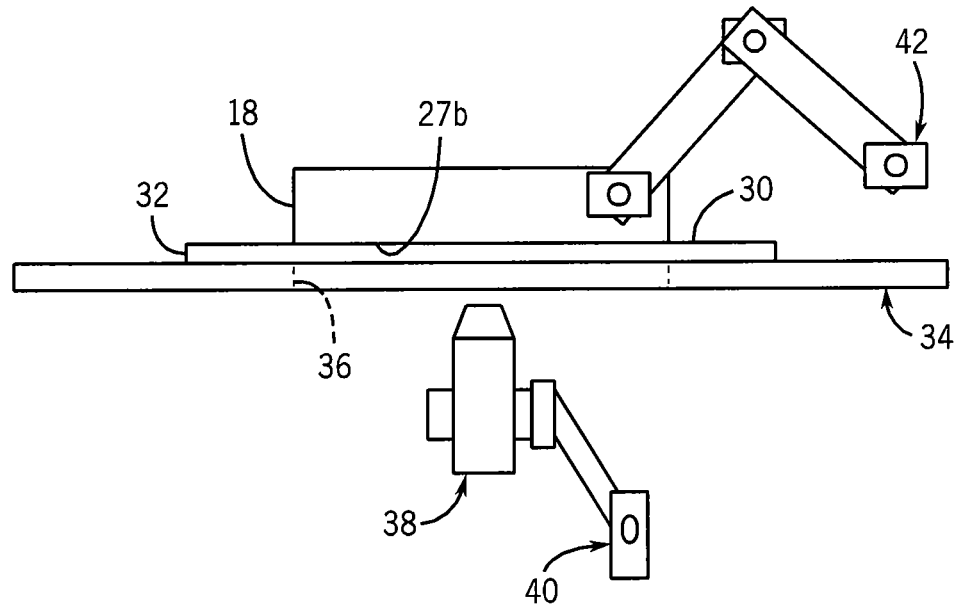
FIG. 4 is a schematic, isometric view of a device for fabricating a composite in accordance with the methodology of the present invention.

Referring to FIGS. 1-4, the present invention is directed to a method of fabricating a composite 10 incorporating fillers 12 with multi-directional orientations. Composite 10 is formed from a pre-polymer matrix material 14 which cures in response to a selected stimulus, e.g. ultraviolet light. It is intended to imbed fillers 12, e.g. micro-sized or nano-sized particles, in composite 10 to produce a material having a micro-tailored structure.

In order to fabricate composite 10, matrix material 14 is selected. For reasons hereinafter described, matrix material 14 must be electrically non-conductive in its liquid state. Further, matrix material 14 must have an attainable melt viscosity or fluid viscosity that allows for fillers 12 in matrix material 14 to align in response to the strength of an electrical field to which matrix material 14 is subjected. In addition, the dielectric constants of matrix material 14 and fillers 12 must be different. Initially, fillers 12, such as, but not limited to, aluminum micro-particles, alumina micro-particles and multi-walled carbon nano-tubes (MWCNT), are deposited into matrix material 14, FIG. 2. In order to attain proper distribution of fillers 12 in matrix material 14, it is contemplated to manually stir and/or mechanically mix matrix material 14 after fillers 12 are deposited therein. In order to aid in the dispersion of fillers 12 in matrix material 14, fillers 12 may be pre-soaked, e.g. in acetone.

Once mixed, matrix material 14 is placed in vacuum oven 16 at a constant temperature, e.g. 100 degrees Celsius, and a constant pressure, e.g. −29 inches of Mercury, in order to remove gas from the sample that may have been added during the mixing process. After matrix material 14 has been degassed, matrix material 14 is ready for processing. It is intended for matrix material 14 to be deposited in mold 18. By way of example, mold 18 may include first and second end walls 20 and 22, respectively, first and second sidewalls 24 and 26, respectively, and bottom wall 27. Inner surfaces 20a and 22a of first and second end walls 20 and 22, respectively, inner surfaces 24a and 26a of first and second sidewalls 24 and 26, respectively, and upper surface 27a of bottom wall 27 define mold cavity 28. Bottom wall 27 is transparent, for reasons hereinafter described. Mold 18 is positioned on transparent slide 32 such that lower surface 27b of bottom wall 27 engages upper surface 30 of transparent slide 32. Slide 32 is positioned on non-conductive support 34.

Through-hole 36 extends though support 34 and is axially aligned with mold cavity 28. Ultraviolet laser emitter 38 is mounted below support 34 and is extendable into through-hole 36 so as to allow laser emitter 38 to direct ultraviolet light at selected portions of mold cavity 28, for reasons hereinafter described. Laser emitter 38 is operatively connected to an electric motor (not shown) through linkage 40 such that the electric motor may position laser emitter 38 at a user desired location. In addition, it is contemplated to operatively connect mold 18 to an electric motor (not shown) through linkage 42 such that the electric motor may position mold 18 on upper surface 30 of slide 32 at a user desired location.

As hereinafter described, it is intended to use a stimulus, such as an electrical field, to rotate fillers 12 in matrix material 14 such that fillers 12 align with the direction of the electric field and create chain-like structures or pseudo-fibers 50. More specifically, when a dielectric material is placed in an electric field, the dielectric material, i.e. fillers 12, will be polarized according to the expression:

$$\mu = \alpha \cdot E \qquad \text{Equation (1)}$$

wherein: $\mu$ is the dipole moment; $\alpha$ is the polarizability tensor; and E is the applied electric field.

For a spherical filler particle, the dipole moment is parallel to applied electric field. Hence, the dipole moment is calculated according to the following expression:

$$\mu = 3 V \epsilon_0 (\epsilon_p - \epsilon_c)/\beta E \qquad \text{Equation (2)}$$

wherein: μ is the dipole moment; V is the particle volume. $\epsilon_0$ is the dielectric constant of free space; $\epsilon_p$ is the relative dielectric constant of the filler particle; $\epsilon_c$ is the relative dielectric constant of the continuous media in which the filler particle is placed; β is the dipole coefficient; and E is the applied electric field.

The dipole coefficient is calculated according to the expression:

$$\beta = \frac{\varepsilon_p - \varepsilon_c}{\varepsilon_p + 2\varepsilon_c} \quad \text{Equation (3)}$$

wherein: β is the dipole coefficient; $\epsilon_p$ is the relative dielectric constant of the filler particle; and $\epsilon_c$ is the relative dielectric constant of the continuous media in which the filler particle placed.

For a non-spherical filler particle, the dipole moment μ is not necessary parallel to the applied electric field E. As such, torque T is introduced when aligning the filler particle in the electric field direction according to the expression:

$$T = \mu \times E \quad \text{Equation (4)}$$

wherein: T is torque, μ is the dipole moment; and E is the applied electric field.

Known as the electrophoretic phenomenon, a suspended charged filler particle migrates under the influence of an applied electric field E because the electric field exerts an electrostatic Coulomb force F on the filler particle through the charge q which it carries. The Coulomb force F is calculated according to the expression:

$$F = qE \quad \text{Equation (5)}$$

wherein: F is the electrostatic Coulomb force on the particle; q is the charge; and E is the applied electric field.

The electrostatic Coulomb force F on the filler particle moves the filler particle toward the electrode with an opposite charge. Motion of a non-charged filler particle in a non-uniform electric field is called dielectrophoresis, which is caused by polarization effects. The electrostatic Coulomb force F acting on a dielectric filler particle in a non-uniform electric field E is calculated according to the expression:

$$F = (\mu * \nabla)E \quad \text{Equation (6)}$$

wherein: F is the electrostatic Coulomb force on the filler particle; μ is the dipole moment; ∇ is the gradient operator vector; and E is the applied electric field. As such, electrostatic Coulomb force F moves the filler particle towards the stronger field region when the filler particle's permittivity exceeds that of the suspension medium. When the permittivity of the suspension medium is greater than that of the filler particle, the electrostatic Coulomb force F moves the filler particle towards the weaker electrical field region.

When more than two filler particles are placed in an applied electric field E, the electric field around one filler particle is disturbed by the electric fields generated by all surrounding filler particles, which leads to attractive and repulsive forces between the filler particle inclusions. The dipole-dipole interactions adjust the relative position of neighboring filler particles and align them along the electric field direction so as to form chains of filler particles parallel with the imposed electric field E. Hence, by providing electric field E in proximity to the matrix material 14, a force is induced on fillers 12 suspended in matrix material 14. This induced force creates a torque on the individual fillers 12 in the matrix material 14. The applied torque then rotates fillers 12 in order for fillers 12 to align with the direction of electric field E and to create chain-like structures or pseudo-fibers 50.

Utilizing the electric-field induced force and the torque, the rotation and alignment times of fillers 12 in matrix material 14 can be calculated. More specifically, the time for an electric field to rotate fillers 12 in matrix material 14 is calculated according to the expression:

$$t_{rotate} \sim 10^2 \eta / \epsilon_0 E^2 \quad \text{Equation (7)}$$

wherein: $t_{rotate}$ is the estimated time it takes to rotate each of the fillers 12; η is the fluid viscosity; $\epsilon_0$ is the permittivity of free space; and E is the electric field strength.

The estimated time for an electric field E to align filler chains is calculated according to the expression:

$$t_{chain} \sim 10 \eta / \epsilon_0 E^2. \quad \text{Equation (8)}$$

wherein: $t_{chain}$ is the estimated time it takes to align the filler chains; η is the fluid viscosity; $\epsilon_o$ is the permittivity of free space; and E is the electric field strength.

In operation, degassed matrix material 14 having fillers 12 mixed therein, as heretofore described, is deposited into mold 18. As is known, an electric field cannot be applied to matters surrounded by conductive materials, since it is shielded by the latter. Hence, in order to apply electric field E to fillers 12, matrix material 14 must be electrically non-conductive in its liquid state. In addition, mold 18 and support 34 must be non-conductive. In a first embodiment, fixed electrodes 46 and 48 are positioned on opposite sides of mold 18. Utilizing the electric motor (not shown) connected to mold 18 through linkage 42, mold 18 is positioned such the desired direction of the chain-like structures or pseudo-fibers to be fabricated in composite 10 is aligned with the direction of the electric field E generated by electrodes 46 and 48. Once mold 18 is positioned, electrodes 46 and 48 are energized so as to generate electric field E. As heretofore described, electric field E in proximity to the matrix material 14 induces a force on fillers 12 suspended in matrix material 14 such that fillers 12 rotate into alignment with the direction of electric field E, thereby creating chain-like structures or pseudo-fibers 50.

After a user selected time period, e.g., the estimated time for electric field E to align the filler chains in matrix material 14, laser emitter 38 is positioned at a user desired location, as heretofore described, so as to be axially aligned with matrix material 14. Thereafter, laser emitter 38 generates ultraviolet light so as to cure the matrix material 14 and form composite 10, thereby fixing pseudo-fibers 50 in alignment with the direction of electric field E.

It is noted that laser emitter 38 may be of sufficient size to cure the entirety of matrix material 14. Alternatively, laser emitter 38 may generate a concentrated beam of ultraviolet light to selectively cure all of matrix material 14 or a selected portion thereof. More specifically, it is contemplated to move laser emitter 38 in a first direction, while moving mold 18 in a perpendicular direction thereto such that all or a selected first portion of matrix material 14 in mold 18 is cured by the ultraviolet light generated by laser emitter 38. After curing a first portion of matrix material 14 in mold 18, mold 18 may be repositioned within electric field E. As a result, pseudo-fibers 50 in matrix material 14 reposition themselves within matrix material 14 so as to be aligned in a second direction, once again generally parallel to the electric field E generated by electrodes 46 and 48. After the realignment of the fillers 12 in the uncured portion of matrix material 14, laser emitter 38 is moved in a first direction, in a small increment, while moving mold 18 is moved in a perpendicular direction thereto such that a second portion of matrix material 14 in mold 18 is cured by the ultraviolet light generated by laser emitter 38. The process is repeated until the entirety of matrix material 14 is cured, thereby resulting in composite 10 having fillers 12 with multi-directional orientations.

Alternatively, instead of repositioning mold 18 within electric field E, it is contemplated to utilize a movable electric field E. After curing a first portion of matrix material 14 in mold 18 as heretofore described, electric field E may be repositioned such that fillers 12 in matrix material 14 reposition themselves within matrix material 14 to be parallel to the electric field E. After the realignment of the fillers 12 in the uncured portion of matrix material 14, laser emitter 38 is moved in a first direction, in a small increment, while mold 18 is moved in a perpendicular direction thereto such that a second portion of matrix material 14 in mold 18 is cured by the ultraviolet light generated by laser emitter 38. The process is repeated until the entirety of matrix material 14 is cured, thereby resulting in composite 10 having fillers 12 with multi-directional orientations.

Figure 5:
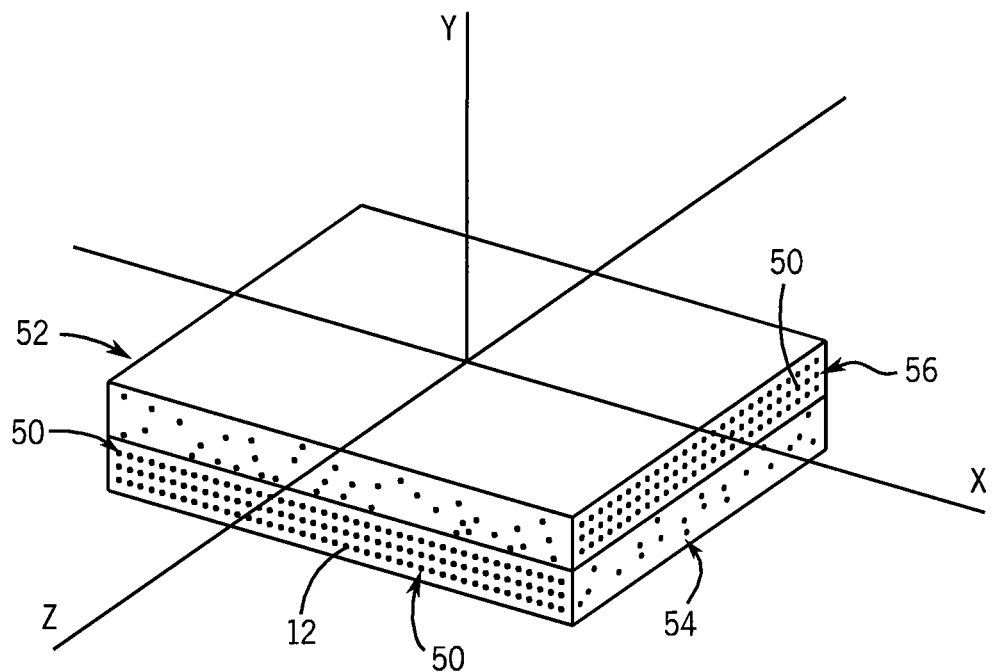
FIG. 5 is a schematic, isometric view of a second composite fabricated in accordance with the methodology of the present invention.

Referring to FIGS. 1 and 5, by utilizing a bottomless mold positioned on upper surface 10a of composite 10 and repeating the process heretofore described, it can be appreciated that a multilayer composite 52 may be fabricated wherein each layer 54 and 56 of composite 52 has fillers 12 with distinct directional orientations. Further, it is contemplated to utilize the method of the present invention in conjunction with other processing techniques, e.g. rapid prototyping.

Figure 6:
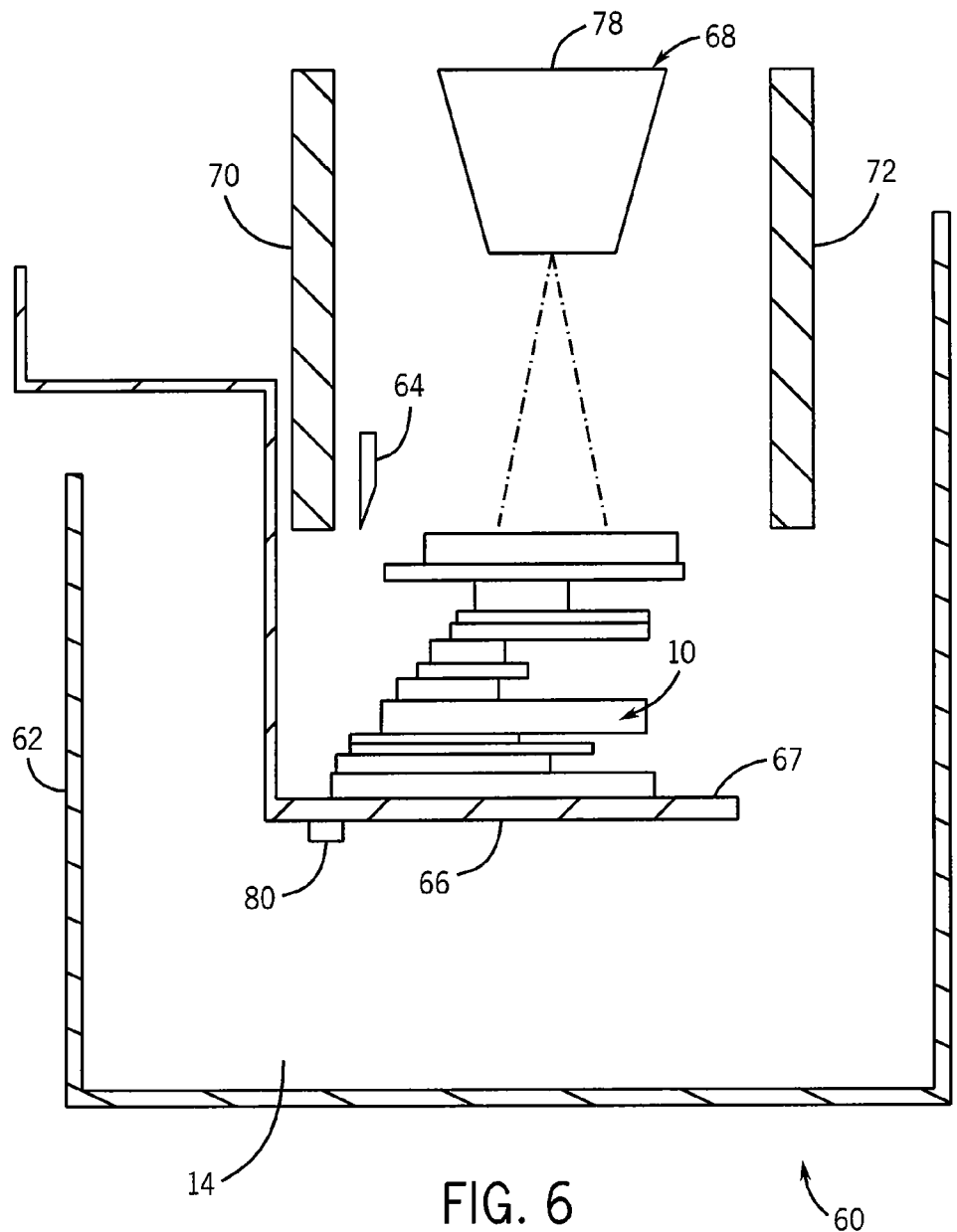
FIG. 6 is a schematic, isometric view of an alternate device for fabricating a composite in accordance with the methodology of the present invention.

Referring to FIG. 6, a rapid prototyping device is generally designated by the reference numeral 60. Device 60 includes photopolymer bath 62 for receiving matrix material 14 having fillers 12 mixed therein. Vertically moveable work platform 66 is provided in bath 62. Work platform 66 includes upper surface 67 on which composite 10 is to be created. It is intended for work platform 66 to be sequentially lowered into bath 62 the thickness of each layer of composite 10 being created. Laser curing apparatus 68 includes head 78 that is moveable in any direction along a horizontal plane above the bath 62 thereby allowing laser curing apparatus 68 to cure each layer of composite 10. Laser curing apparatus 68 can be adjusted optically for curing depth and precision. Device 60 further includes re-coating blade 64. Blade 64 sweeps over the top of the composite 10 as each layer of composite 10 is created in order to ensure that each cured layer of composite 10 has the correct layer thickness.

Electrodes 70 and 72 are provided to generate electric field E used to manipulate the alignment of fillers 12 in matrix material 14. Electrodes 70 and 72 may be attached to head 78 of laser curing apparatus 68 and can be rotated around head 68 in order to facilitate the orientation of filler 12 in matrix material 14 in desired locations. Alternatively, generally parallel electrodes may be provided in bath 62, in a generally common horizontal plane with the layer of composite 12 being cured. The electrodes in bath 62 can be rotated ninety degrees in order to facilitate the orientation of filler 12 in matrix material 14 along any path in the horizontal plane. It is further contemplated for electrode 80 to be incorporated into work platform 66 to work in conjunction with electrodes 70 and 72 so as to allow fillers 12 in matrix material 14 to be orientated in vertical positions through the thickness of composite 12.

As heretofore described, the methodology of the present invention utilizes an electric field as a tool to manipulate fillers in polymer composites. By providing an electric field with a proper strength and in a proper direction, multifunctional polymer composite structures with fillers altered for design specifications may be created.

Various modes of carrying out the invention are contemplated as being within the scope of the following claims particularly pointing out and distinctly claiming the subject matter which is regarded as the invention.

We claim:

1. A method of fabricating a composite incorporating fillers, comprising the steps of:
   depositing the fillers in a matrix material;
   exposing a first portion of the matrix material to an electrical field such that the fillers in the first portion of the matrix material align in a first direction in response thereto;
   curing the first portion of the matrix material;
   reorientating at least one of the first portion of matrix material and the electrical field;
   exposing a second portion of the matrix material to the electrical field such that the fillers in the second portion of the matrix material align in a second direction in response thereto; and
   curing the second portion of the matrix material.

2. The method of claim 1 comprising the additional step of depositing the first portion of the matrix material in a mold prior to exposing the first portion of the matrix material to the electrical field.

3. The method of claim 2 comprising the additional steps of depositing the second portion of the matrix material into the mold contact with the first portion of matrix material prior to exposing the second portion of matrix material to the electrical field.

4. The method of claim 3 wherein the first direction is generally parallel to the second direction.

5. The method of claim 1 comprising the additional step of dispersing the fillers in the matrix material prior to exposing the first portion of the matrix material to the electrical field.

6. The method of claim 1 wherein the step of exposing the first portion of the matrix material to an electrical field includes the steps of:
   depositing the first portion of the matrix material in a mold; and
   positioning the mold at a desired location with respect to the electrical field.

7. The method of claim 1 wherein the step of exposing the first portion of the matrix material to an electrical field includes the step of positioning the electrical field at a desired location with respect to the matrix material.

8. A method of fabricating a composite incorporating fillers, comprising the steps of:
   depositing the fillers in a matrix material;
   inserting a first portion of the matrix material into a mold;
   positioning the mold at a desired location with respect to an electrical field such that at least a portion of the fillers in the first portion of the matrix material align in a first direction in response thereto;
   curing the first portion of the matrix material
   reorientating at least one of the first portion of matrix material and the electrical field;
   exposing a second portion of the matrix material to the electrical field such that the fillers in the second portion of the matrix material align in a second direction in response thereto; and
   curing the second portion of the matrix material.

9. The method of claim 8 wherein the first direction is generally parallel to the second direction.

10. The method of claim 8 comprising the additional step of:
    depositing a second portion of the matrix material in contact with the first portion of matrix material prior to exposing the second portion of the matrix material to the electrical field.

11. The method of claim 8 comprising the additional step of dispersing the fillers in the matrix material prior to inserting the matrix material into the mold.

12. The method of claim 8 further comprising the additional step of positioning the electrical field at a desired location with respect to the matrix material.

13. A method of fabricating a composite incorporating fillers, comprising the steps of:
    depositing a first portion of matrix material having fillers onto a work platform;
    positioning the first portion of the matrix material within a stimulus field such that at least a portion of the fillers in the first portion of the matrix material align in a first direction in response thereto;
    curing the first portion of the matrix material to form a first layer:
    reorientating at least one of the first layer and the stimulus field;
    depositing a second portion of the matrix material on the first layer;
    exposing the second of the matrix material to the stimulus such that the fillers in the second portion of the matrix material align in a second direction in response thereto; and
    curing the second portion of the matrix material to form a second layer.

14. The method of claim 13 wherein the stimulus field is an electrical field.

15. The method of claim 13 wherein the first direction is generally parallel to the second direction.

16. The method of claim 13 comprising the additional step of dispersing the fillers in the matrix material prior to depositing the first portion of the matrix material onto the work platform.

17. The method of claim 13 wherein the step of positioning the first portion of the matrix material within a stimulus field includes the step of positioning the stimulus field at a desired location with respect to the first portion of the matrix material.

\* \* \* \* \*